United States Patent [19]

Maxey

[11] B 3,919,179

[45] Nov. 11, 1975

[54] THREE-COMPONENT ACCELERATOR SYSTEM

[75] Inventor: Frank S. Maxey, Akron, Ohio

[73] Assignee: The Goodyear Tire & Rubber Company, Akron, Ohio

[22] Filed: Apr. 18, 1972

[21] Appl. No.: 245,194

[44] Published under the Trial Voluntary Protest Program on January 28, 1975 as document no. B 245,194.

[52] U.S. Cl. ........ 260/79.5 C; 252/182; 260/79.5 B; 260/79.5 P; 260/784; 260/785; 260/786; 260/793

[51] Int. Cl. ..... C08c 11/56; C08c 11/62; C08d 9/00

[58] Field of Search ..... 260/79.5 R, 79.5 B, 79.5 C, 260/784, 785, 786, 793; 252/182

[56] References Cited

UNITED STATES PATENTS

| | | | |
|---|---|---|---|
| 3,491,069 | 1/1970 | Brooks | 260/79.5 |
| 3,558,739 | 1/1971 | Kagarise | 260/79.5 |

*Primary Examiner*—Christopher A. Henderson
*Attorney, Agent, or Firm*—F. W. Brunner; J. A. Rozmajzl

[57] ABSTRACT

Three-component accelerator system for the vulcanization of rubber, one accelerator being 2-(morpholinodithio)-benzothiazole, a second accelerator being a compound such as 2-(morpholinothio)-benzothiazole, and a third accelerator being a thiuram such as tetramethylthiuram disulfide.

8 Claims, No Drawings

THREE-COMPONENT ACCELERATOR SYSTEM

This invention relates to an improved accelerator system for the vulcanization of rubber. More particularly it relates to a three-component accelerator system which provides a vulcanized rubber possessing improved physical properties.

Rubber compounders are constantly searching for improved accelerator systems for the vulcanization of rubber. Such accelerator systems should preferably provide good scorch resistance, reasonable vulcanization rates and adequate physical properties, both aged and unaged.

It is an object of this invention to provide an accelerator system to be used in the vulcanization of rubber. It is a further object of this invention to provide an accelerator system which provides, on vulcanization, a vulcanizate having improved physical properties. It is another object of this invention to provide vulcanizable rubber compositions which are capable of being vulcanized to provide improved vulcanizates. Other objects will become apparent subsequently herein.

The objects of the present invention are accomplished by vulcanizing a rubbery composition containing an accelerator system comprising (A) 2-(morpholinodithio)-benzothiazole, (B) a second accelerator which is a benzothiazole and (C) a thiuram accelerator.

The second accelerator has the following structural formula:

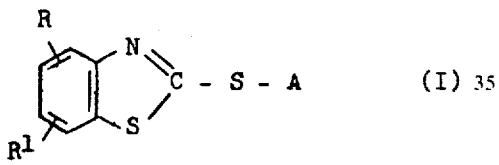

wherein A is selected from the group consisting of hydrogen,

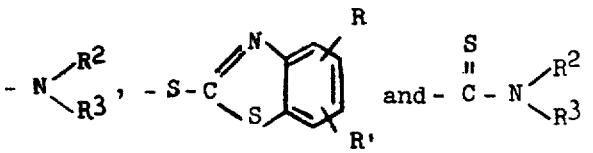

wherein R and R¹ are selected from the group consisting of hydrogen, nitro, chloro, alkyl radicals having from 1 to 4 carbon atoms and alkoxy radicals having from 1 to 4 carbon atoms and wherein R² and R³ are selected from the group consisting of alkyl radicals having from 1 to 6 carbon atoms, cycloalkyl radicals having from 5 to 12 carbon atoms, aralkyl radicals having from 7 to 13 carbon atoms and aryl radicals having from 6 to 12 carbon atoms and R² and R³ can be joined through a member selected from the group consisting of —CH₂—, —O— and —S— to constitute with the attached nitrogen group of heterocyclic radical where A is

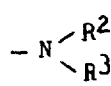

R³ can also be hydrogen.

Specific examples of the derivative of the second accelerator conforming to above recited structural formula I when A is

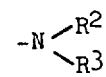

are represented below by a listing of specific radicals, any combination of which in structural formula I above represents a specific second accelerator. R and R¹ can be the same or different.

| R | R¹ | ( R² — R³ ) | Where R² and R³ together with the nitrogen form a heterocyclic ring |
|---|---|---|---|
| hydrogen | methyl | methyl | morpholino |
| methyl | ethyl | ethyl | pyrrolidinyl |
| methoxy | isopropyl | isopropyl | piperidino |
| ethoxy | cyanoethyl | cyanoethyl | cyclohexamethyleneamino |
| nitro | n-butyl | n-butyl | 2,6-dimethylmorpholino |
| chloro | sec.butyl | sec.butyl | thiomorpholino |
| | tert.butyl | tert.butyl | N-methylpiperizinyl |
| | cyclohexyl | cyclohexyl | 3-methylpiperidino |
| | | | 2-methylpiperidino |
| | | | 4-methylpiperidino |

Particularly preferred second accelerators are the following.
  benzothiazyl disulfide
  2-(morpholinothio)-benzothiazole
  N-(cyclohexyl)-2-benzothiazolesulfenamide
  N-(t-butyl)-2-benzothiazolesulfenamide
  N,N-(diisopropyl)-2-benzothiazolesulfenamide
  2-(2,6-dimethylmorpholinothio)-benzothiazole
  N,N-(diethyl)-2-benzothiazolesulfenamide
  N-(octyl)-2-benzothiazolesulfenamide
  2-(3-methylpiperidinothio)-benzothiazole The following compounds illustrate the second accelerator of structural formula I when A is a substituted or unsubstituted benzothiazole radical.
  benzothiazyl disulfide
  2-(5-chlorobenzothiazolyl) disulfide
  2-(6-nitrobenzothiazolyl) disulfide
  2-(6-ethoxybenzothiazolyl) disulfide When A is hydrogen the second accelerator of structural formula I can be a compound such as 2-mercaptobenzothiazole.

When A is

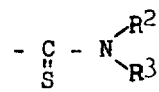

illustrative compounds are as follows.
  2-benzothiazyl N,N-dimethylthiocarbamoyl sulfide
  2-benzothiazyl N,N-diethylthiocarbamoyl sulfide
  2-benzothiazyl N,N-diisopropylthiocarbamoyl sulfide The thiuram accelerator has the following structural formula

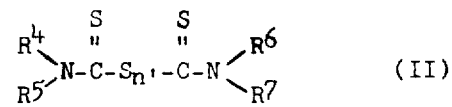

wherein $R^4$ and $R^6$ are selected from the group consisting of alkyl radicals having from 1 to 4 carbon atoms, cycloalkyl radicals having from 5 to 12 carbon atoms and aralkyl radicals having from 7 to 13 carbon atoms, $R^5$ and $R^7$ are selected from the group consisting of $R^4$, $R^6$ and aryl radicals having from 6 to 12 carbon atoms and $R^4$ and $R^5$, and $R^6$ and $R^7$ can be joined through a member of the group consisting of $-CH_2-$, $-O-$ and $-S-$ to constitute with the attached nitrogen group a heterocyclic radical and $n'$ is an integer of a value from 1 to 4.

Examples of specific thiuram compounds that conform to the above recited structural Formula II are represented below by a list of specific radicals and values of $n'$, any combination of which in the structural Formula II above represents a specific compound within the scope of the present invention.

| $R^4$ | $R^5$ | $R^6$ | $R^7$ | $n'$ |
|---|---|---|---|---|
| Methyl | Methyl | Methyl | Methyl | 1 |
| Ethyl | Ethyl | Ethyl | Ethyl | 2 |
| Isopropyl | Isopropyl | Isopropyl | Isopropyl | 3 |
| Butyl | Butyl | Butyl | Butyl | |
| Phenyl | | Phenyl | | |

Preferred thiuram accelerators are those according to structural Formula II wherein $R^4$, $R^5$, $R^6$ and $R^7$ are alkyl radicals having from 1 to 2 carbon atoms.

Preferably $n'$ is 2.

The following are thiuram accelerators represented by the proper selection of radicals from the previous list of radicals.

tetramethylthiuram monosulfide
tetramethylthiuram disulfide
tetraethylthiuram monosulfide
tetraethylthiuram disulfide
dipentamethylenethiuram disulfide
N,N'-dimethyl-N,N'-diphenylthiuram disulfide The 2-(morpholinodithio)-benzothiazole (MDB) is well known in the art and can be prepared by well known processes such as that described in U.S. Pat. No. 2,837,519.

The second accelerators are well known in the art and can be prepared by well known processes such as those described in U.S. Pat. Nos. 1,631,871; 2,024,575; 2,045,888; 2,191,656 and 2,615,893.

The thiuram compounds may be prepared by various methods including those described at pages 38–42 in *Rubber Chemicals* by J. Van Alphen, Elsevier Publishing Co., 1956.

The accelerator system of the present invention is used in vulcanizable rubber compositions, compounded and uncompounded, along with 0.00 to 3.25 parts by weight of free sulfur based on 100 parts by weight of uncompounded rubber. The MDB must comprise 20 to 70 percent (preferably 30 to 60 percent) of the total three-component accelerator combination. The second accelerator comprises 10 to 60 percent (preferably 20 to 40 percent) of the combination. The thiuram disulfide also comprises 10 to 60 percent (preferably 20 to 40 percent) of the combination.

The accelerator level varies from 0.50 to 5.50 parts by weight per 100 parts by weight of uncompounded rubber. Improvements in physical properties are obtained at low sulfur levels and in sulfurless systems, i.e., from 0.00 to and including 1.25 parts of free sulfur based on 100 parts by weight of uncompounded rubber. Improvements are also obtained when a high sulfur level (above 1.25 parts and up to 3.25 parts of free sulfur) is used. The present invention, however, is most beneficial at low sulfur levels.

Th sum of the three-component accelerator system and the sulfur ranges from 2.25 to 5.50 parts by weight per 100 part by weight of rubber.

The accelerator can be compounded into the rubber by any conventional method, such as by addition to the rubber on a mill or a Banbury when the rubber is a solid. The rubbers can contain any conventional compounding ingredients such as carbon black, zinc oxide and even other accelerators to the extent that the accelerators do not interfere substantially with the improvement offered by the accelerator system of the present invention.

The rubber vulcanizates prepared by using this accelerator system can be used in any of their normal applications, such as in pneumatic vehicle tires and industrial products.

Some of the following examples are intended to illustrate but not to limit the practice of the present invention. Unless indicated otherwise, all parts are parts by weight.

Natural rubber, SBR (rubbery butadiene-1,3/styrene copolymers) and NBR (rubbery butadiene-1,3/acrylonitrile copolymers) were compounded with the accelerator system of the present invention and both high and low levels of sulfur using conventional Banburying and milling procedures. The productive stocks were than vulcanized and tested.

The non-productive formulations for the compounded rubbers were as follows in parts by weight.

| Ingredients | Formulations | | |
|---|---|---|---|
| | A | B | C |
| Natural | 100.0 | | |
| SBR 1500 | | 100.0 | |
| 67/33 butadiene-1,3/ acrylonitrile | | | 100.0 |
| zinc oxide | 5.0 | 3.0 | 5.0 |
| stearic acid | 1.0 | 2.0 | 1.0 |
| amine antioxidant | 1.0 | 1.0 | 1.0 |
| HAF black | 40.0 | 40.0 | 40.0 |
| petroleum softener | 3.0 | | 5.0 |
| dibutyl phthalate processing oil | | 5.0 | |

Formulation B was used in preparing Examples 1 to 7. Formulation C was used in preparing Examples 8 to 14. Examples 6, 7, 13 and 14 illustrate the practice of the present invention. It is understood in each of the following examples that in addition to the sulfur and accelerator amounts indicated, the rubbers also contained the ingredients indicated in the non-productive formulations recited earlier herein.

| Examples 1 to 7 (High Sulfur-SBR) | | | | | | | |
|---|---|---|---|---|---|---|---|
| | 1 | 2 | 3 | 4 | 5 | 6 | 7 |
| Sulfur | 1.75 | 1.75 | 1.75 | 1.75 | 1.75 | 1.75 | 1.75 |
| MDB(1) | 1.00 | | | .50 | .90 | .45 | .45 |
| MBTS(2) | | 1.00 | 1.17 | | | | .45 |
| MOR(3) | | 1.00 | | .50 | | .45 | |
| TMTD(4) | | | | | .10 | .10 | .10 |
| OCT(5) | 40 | 45 | 60 | 41 | 30 | 20 | 30 |
| Scorch(6) | 30+ | 30+ | 30+ | 30+ | 27 | 25 | 28 |
| T(7) | 232 | 227 | 227 | 248 | 236 | 244 | 238 |
| E(7) | 510 | 630 | 700 | 560 | 410 | 520 | 410 |
| 300M(8) | 99 | 77 | 60 | 98 | 109 | 106 | 119 |
| Shore A(8) | 62 | 63 | 59 | 63 | 63 | 63 | 63 |
| Tear(9) | 44 | 40 | 42 | 39 | 40 | 40 | 39 |
| Aged(10) | | | | | | | |
| T | 189 | 186 | 181 | 200 | 189 | 207 | 209 |
| E | 320 | 320 | 400 | 370 | 270 | 410 | 420 |
| Aged | | | | | | | |
| 300M | 183 | 180 | 141 | 147 | — | 147 | 141 |
| Shore A | 72 | 73 | 70 | 70 | 73 | 71 | 73 |
| Flex(11) | | | | | | | |
| Orig. | 175 | 141 | 110 | 182 | 126 | 140 | 148 |
| Aged | 100 | 60 | 65 | 108 | 40 | 120 | 118 |
| GF(12) | | | | | | | |
| Orig. | 29.6 | 36.6 | 30.0 | 29.6 | 28.2 | 28.2 | 28.4 |
| Aged | 26.2 | 26.2 | 27.2 | 27.0 | 26.8 | 26.2 | 26.8 |
| Set(13) | 43.1 | 58.0 | 60.0 | 46 | 38 | 32 | 42 |

(1) 2-(morpholinodithio)-benzothiazole
(2) benzothiazyl disulfide
(3) 2-(morpholinothio)-benzothiazole
(4) tetramethylthiuram disulfide
(5) Optimum cure time (OCT) was determined using the Monsanto Rheometer. 100 CPM 3° arc. 143°C.
(6) Mooney Scorch at 120°C..Δ5.
(7) T/E is a measure of the tensile strength and elongation (Kg/cm² abd %).
(8) 300M is a measurement of the stress at 300% elongation. Shore A is a measure of the hardness as measured by the Shore A durometer.
(9) Crescent tear test (Die C).
(10) Aged T/E is tensile and elongation properties measured after the samples had been aged in a hot air oven for 70 hours at 100°C.
(11) Flex test is the Goodyear 66⅔ Flex test. Original tests were run at 25°C. while aged refers to the flex test results run after the samples had been aged in a hot air oven for 22 hours at 100°C.
(12) Goodrich Flexometer.ΔT(°C.)
(13) Percent recovery after being compressed to 25 percent of its original height and held for 22 hours at 100°C.

The results in Examples 1 to 7 indicate that systems of the present invention (Examples 6 and 7) were superior to the other systems tested in both aged T/E and aged Flex. A 0.50/0.50 MDB/MBTS and a 0.90/0.10 MOR/TMTD system were also used. The former was inferior to Examples 6 and 7 re compression set. Both were inferior to Examples 6 and 7 re aged Flex.

| Examples 8 to 14 (Low Sulfur-NBR) | | | | | | | |
|---|---|---|---|---|---|---|---|
| | 8 | 9 | 10 | 11 | 12 | 13 | 14 |
| Sulfur | 0.3 | 0.3 | 0.3 | 0.3 | 0.3 | 0.3 | 0.3 |
| MDB | 3.0 | | | | 1.5 | 1.0 | 1.0 |
| MBTS | | | 3.5 | | | | 1.0 |
| MOR | | 3.0 | | 3.0 | 1.5 | 1.0 | 1.0 |
| TMTD | | | | | | | |
| OCT | 30 | 35 | 35 | 18 | 14 | 25 | 30 |
| Scorch | 30+ | 30+ | 30+ | 10 | 16 | 24 | 30 |
| T | 236 | 153 | 196 | 173 | 225 | 230 | 228 |
| E | 610 | 660 | 680 | 380 | 480 | 480 | 460 |
| 300M | 68 | 35 | 53 | 127 | 140 | 126 | 127 |
| Shore A | 66 | 64 | 66 | 67 | 69 | 65 | 65 |
| Tear | 50 | 48 | 47 | 37 | 41 | 46 | 46 |
| Aged | | | | | | | |
| T | 204 | 182 | 168 | 154 | 210 | 212 | 210 |
| E | 390 | 450 | 470 | 260 | 420 | 360 | 340 |
| Aged | | | | | | | |
| 300M | 155 | 57 | 70 | — | 175 | 182 | 180 |
| Shore A | 75 | 76 | 75 | 75 | 75 | 73 | 73 |
| Flex | | | | | | | |
| Orig. | 101 | — | — | — | 104 | 118 | 116 |
| Aged | 70 | — | — | — | 90 | 110 | 108 |
| Oil Aged | | | | | | | |
| T | 190 | 140 | 147 | 134 | 198 | 198 | 200 |
| E | 380 | 200 | 560 | 450 | 400 | 420 | 410 |
| 300M | 160 | — | 56 | 63 | 162 | 105 | 106 |
| Shore A | 50 | 44 | 47 | 51 | 56 | 54 | 54 |
| Set(150°C.) | 59 | 70 | 66 | 22 | 24 | 24 | 27 |

The results in Examples 8 to 14 indicate that systems of the present invention (Examples 13 and 14) were superior to the other systems tested in either aged T/E, Compression Set or Flex.

Formulation A was used at the 2.75 part sulfur level. A 0.20/0.20/0.20 MDB/MOR/TMTD combination resulted in a vulcanizate possessing overall physical properties superior to those of its components alone. A 0.30/0.30 MDB/MOR combination provided superior Tear and Flex, both original and aged, but provided inferior aged T/E.

Formulation A was also used at the 0.3 part sulfur level. A 1.0/1.0/1.0 MDB/MOR/TMTD combination provided overall properties superior to those of the components alone. A 1.5/1.5 MDB/MOR combination was similar, but possessed slightly poorer flex and substantially poorer Compression Set.

Formulation A was also used in a sulfurless system. A 2.5/1.0/1.5 and a 1.0/2.5/1.5 MDB/MOR/TMTD system provided a much better overall combination of physical properties than a 3.0/3.0 MOR/TMTD system.

Formulation C was used with 1.75 parts of sulfur. A 0.27/0.27/0.27 MDB/MOR/TMTM system possessed an overall combination of physical properties superior to those of the individual components alone. Its Compression Set and aged Flex were quite superior to these same properties of a vulcanizate prepared using a 0.40/0.40 MDB/MOR system. Both the original Flex and aged Flex were superior to that obtained with a 0.60/0.20 MDB/tetramethylthiuram monosulfide (TMTM) system.

Formulation B was used with 0.30 part of sulfur. A 1.0/1.0/1.0 MDB/MOR/TMTD system was superior overall to any of the components used alone. A 1.5/1.5 MDB/MOR system provided similar properties and was inferior overall particularly in Compression Set. A 1.5/1.5 MDB/TMTD combination provided slightly better Compression Set, but had quite inferior aged Flex properties.

Formulation B was also used with a sulfurless system. 2.5/1.5/1.0 and 1.5/1.5/1.5 MDB/MOR/TMTD systems were used and were superior to a 1.5/3.0 MDB/TMTD system. A 2.5/1.0/1.0 MDB/TMTD/MBTS system was superior to a 3.0/3.0 TMTD/MBTS system.

Formulation C was used with a sulfurless system. A 2.5/1.5/1.0 and a 1.5/1.5/2.0 system were superior to a 3.0/3.0 MOR/TMTD system. Although they were more similar to a 2.5/1.5 MDB/TMTM system, they do possess better Compression Set, particularly the latter system. A 1.25/1.25/1.25 MDB/MBTS/TMTD system possessed original and aged Flex superior to the 2.5/1.5 MDB/TMTM system.

Overall, all of the three-component systems tested have what could be considered an overall superior combination of physical properties. Although sometimes inferior in some properties, the vulcanizates prepared using the three-component system were always superior to any system with which it was concerned in at least one of the following properties: ages T/E, Flex (original or aged), Compression Set or Goodrich Flexometer.

The aforementioned properties are quite important in various application. compression Set is important with regard to seals and gaskets. Flex is important in belt and tire applications. Aged T/E is important with regard to tires and high temperature belts and hose. Goodrich Flex properties would be considered where a polymer was to be used in a motor mount.

The other accelerator compounds described earlier herein could have been substituted for their counterparts in the preceding working examples to produce vulcanizates with a superior combination of physical properties.

Likewise, various other polymers could have been substituted for those used in the preceding working examples, such as cis-1,4 polyisoprene, cis-1,4 polybutadiene or ethylene/propylene/1,4-hexadiene polymers. Naturally, as the rubber is changed or a different loading is used, standard changes in the compounding recipe would be made to obtain optimum results.

The sulfur vulcanizable rubbers that will benefit from this invention include natural rubber and synthetic rubbers and mixtures thereof. Synthetic rubbers that can be improved by the practice of the present invention include all diene rubbers including the following elastomers, either alone or in blends, cis-1,4 polyisoprene, polybutadiene, including cis-1,4 polybutadiene, rubbery copolymers of 1,3-dienes such as 1,3-butadiene, isoprene or 2,3-dimethyl-1,3-butadiene with other monomers, for example, styrene, acrylonitrile and methyl methacrylate. Ethylene propylene terpolymers (EPDM), i.e., with a non-conjugated diene, for example, terpolymers of ethylene propylene and dicyclopentadiene or 1,4-hexadiene or ethylidene norbornene can also benefit from the present invention. For maximum benefit, the EPDM polymer should be classified as "fast curing" or "ultra fast curing". In fact, for best results any polymer used should vulcanize readily. Chlorinated polymers which possess unsaturation such as polychloroprene will show improved vulcanizate properties when used in the practice of the present invention as will polyalkenamers such as polyoctenamer prepared by a ring opening process involving cyclooctene. Although it is generally preferred that the mole percent unsaturation of the polymer be at least 1.0 to 2.0 percent and higher, the source of the double bond must be considered. For example, EPDM polymers prepared using ethylidene norbornene as the termonomer vulcanize more readily than an EPDM polymer prepared using dicyclopentadiene as the termonomer.

A particularly preferred embodiment of the present invention involves the use of 0.10 to 1.25 parts of free sulfur.

While certain representative embodiments and details have been shown for the purpose of illustrating the invention, it will be apparent to those skilled in this art that various changes and modifications may be made therein without departing from the spirit or scope of the invention.

What is claimed is:

1. A sulfur vulcanizable rubber containing 0.00 to 3.25 parts of free sulfur per 100 parts by weight of rubber and 0.50 to 5.50 parts by weight of an accelerator system per 100 parts by weight of rubber, said accelerator system comprising A. 2-(morpholinodithio)-benzothiazole, and
B. at least one benzothiazole accelerator having the following structural formula

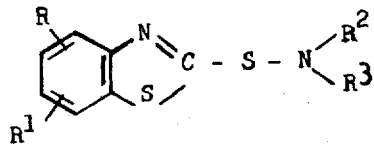

wherein R and R¹ are selected from the group consisting of hydrogen, nitro, chloro, alkyl radicals having from 1 to 4 carbon atoms and alkoxy radicals having from 1 to 4 carbon atoms and wherein R² is selected from the group consisting of alkyl radicals having from 1 to 6 carbon atoms, cycloalkyl radicals having from 5 to 12 carbon atoms, aralkyl radicals having from 7 to 13 carbon atoms and aryl radicals having from 6 to 12 carbon atoms, wherein R³ is selected from hydrogen and the radicals for R², and R² and R³ can be joined through a member selected from the group consisting of —CH₂—, —O— and —S— to constitute with the attached nitrogen group of heterocyclic radical and C. a thiuram accelerator having the following structural formula

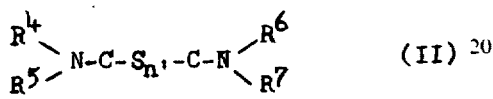   (II)

wherein R⁴ and R⁶ are selected from the group consisting of alkyl radicals having from 1 to 4 carbon atoms, cycloalkyl radicals having from 5 to 12 carbon atoms and aralkyl radicals having from 7 to 13 carbon atoms, R⁵ and R⁷ are selected from the group consisting of R⁴, R⁶ and aryl radicals having from 6 to 12 carbon atoms and R⁴ and R⁵, and R⁶ and R⁷ can be joined through a member of the group consisting of —CH₂—, —O— and —S— to constitute with the attached nitrogen group a heterocyclic radical and $n'$ is an integer of a value from 1 to 4, wherein the weight ratio of A/B/C is 20 to 70/10 to 60/10 to 60 based on 100 parts by a weight of A, B and C and wherein the sum of the weights of the accelerator system and the sulfur is from 2.25 to 5.50 parts by weight per 100 parts by weight of rubber.

2. A sulfur vulcanizable rubber containing 0.00 to 3.25 parts of free sulfur per 100 parts by weight of rubber and 0.50 to 5.50 parts by weight of an accelerator system per 100 parts by weight of rubber, said accelerator system comprising A. 2-(morpholinodithio)-benzothiazole, and
B. at least one benzothiazole accelerator selected from the group consisting of
2-(morpholinothio)-benzothiazole,
N-(cyclohexyl)-2-benzothiazolesulfenamide,
N-(t-butyl)-2-benzothiazolesulfenamide,
N,N-(diisopropyl)-2-benzothiazolesulfenamide,
2-(2,6-dimethylmorpholinothio)-benzothiazole,
N,N-(diethyl)-2-benzothiazolesulfenamide,
N-(octyl)-2-benzothiazolesulfenamide and
2-(3-methylpiperidinothio)-benzothiazole,
and
C. at least one thiuram accelerator selected from the group consisting of
tetramethylthiuram monosulfide,
tetramethylthiuram disulfide,
tetraethylthiuram monosulfide,
tetraethylthiuram disulfide,
dipentamethylenethiuram disulfide, and
N,N'-dimethyl-N,N-diphenylthiuram disulfide
wherein the weight ratio of A/B/C is 20 to 70/10 to 60/10 to 60 based on 100 parts by weight of A, B and C and wherein the sum of the weights of the accelerator system and the sulfur is from 2.25 to 5.50 parts by weight per 100 parts by weight of rubber.

3. The sulfur vulcanizable rubber according to claim 1 wherein R³ is hydrogen.

4. The sulfur vulcanizable rubber according to claim 1 wherein the sulfur level is from 0.00 to 1.25 parts.

5. The sulfur vulcanizable rubber according to claim 1 wherein the sulfur level is above 1.25 parts and up to 3.25 parts.

6. The sulfur vulcanizable rubber according to claim 1 wherein the rubber contains 2-(morpholinothio)-benzothiazole and tetramethylthiuram disulfide.

7. A process of preparing a rubbery vulcanizate comprising heating the sulfur vulcanizable rubber of claim 1 at a vulcanizing temperature.

8. The sulfur vulcanizable rubber according to claim 1 wherein A comprises 30 to 60 percent, B comprises 20 to 40 percent, and C comprises 20 to 40 percent by weight of the three-component accelerator system.

* * * * *